United States Patent [19]
Lueshen

[11] 3,845,608
[45] Nov. 5, 1974

[54] CONTINUOUS LOOSE HAY STACKING MACHINE

[75] Inventor: Deldon Lueshen, Wisner, Nebr.

[73] Assignee: Farmhand, Inc., Hopkins, Minn.

[22] Filed: Apr. 25, 1973

[21] Appl. No.: 354,254

Related U.S. Application Data

[63] Continuation-in-part of Ser. No. 243,222, April 12, 1972, abandoned.

[52] U.S. Cl.................... 56/13.3, 56/344, 214/522, 302/60
[51] Int. Cl............................................ A01d 87/10
[58] Field of Search .......... 56/12.8, 13.3, 344, 345, 56/346, 364; 302/17, 36, 52, 56, 59, 60, 61; 214/518, 522, 508, 509, 82, 83, 28

[56] References Cited
UNITED STATES PATENTS

| | | | |
|---|---|---|---|
| 2,585,891 | 2/1952 | Worsdell | 214/41 |
| 2,930,657 | 3/1960 | Delzer | 302/56 |
| 2,941,843 | 6/1960 | Crump | 302/56 |
| 2,955,403 | 10/1960 | McKee | 56/13.3 |
| 3,412,532 | 11/1968 | Nickla | 56/13.3 |
| 3,556,327 | 1/1971 | Garrison | 214/522 |

OTHER PUBLICATIONS
Brochure on "Stack-n-Mover" by McKee Bros. Limited, Ontario, Canada.

Primary Examiner—Russell R. Kinsey
Attorney, Agent, or Firm—Merchant, Gould, Smith & Edell

[57] ABSTRACT

A container having an opening in a front wall adjacent the top of the container and defining a chamber for reception of material from the discharge portion of a conduit extending upwardly from an impeller for filling the chamber with crop material. The discharge portion of the conduit is movable from side to side of the container and delivers material into the container in all positions of the conduit. The container has a top wall mounted for movements toward and away from the bottom of the container.

18 Claims, 17 Drawing Figures

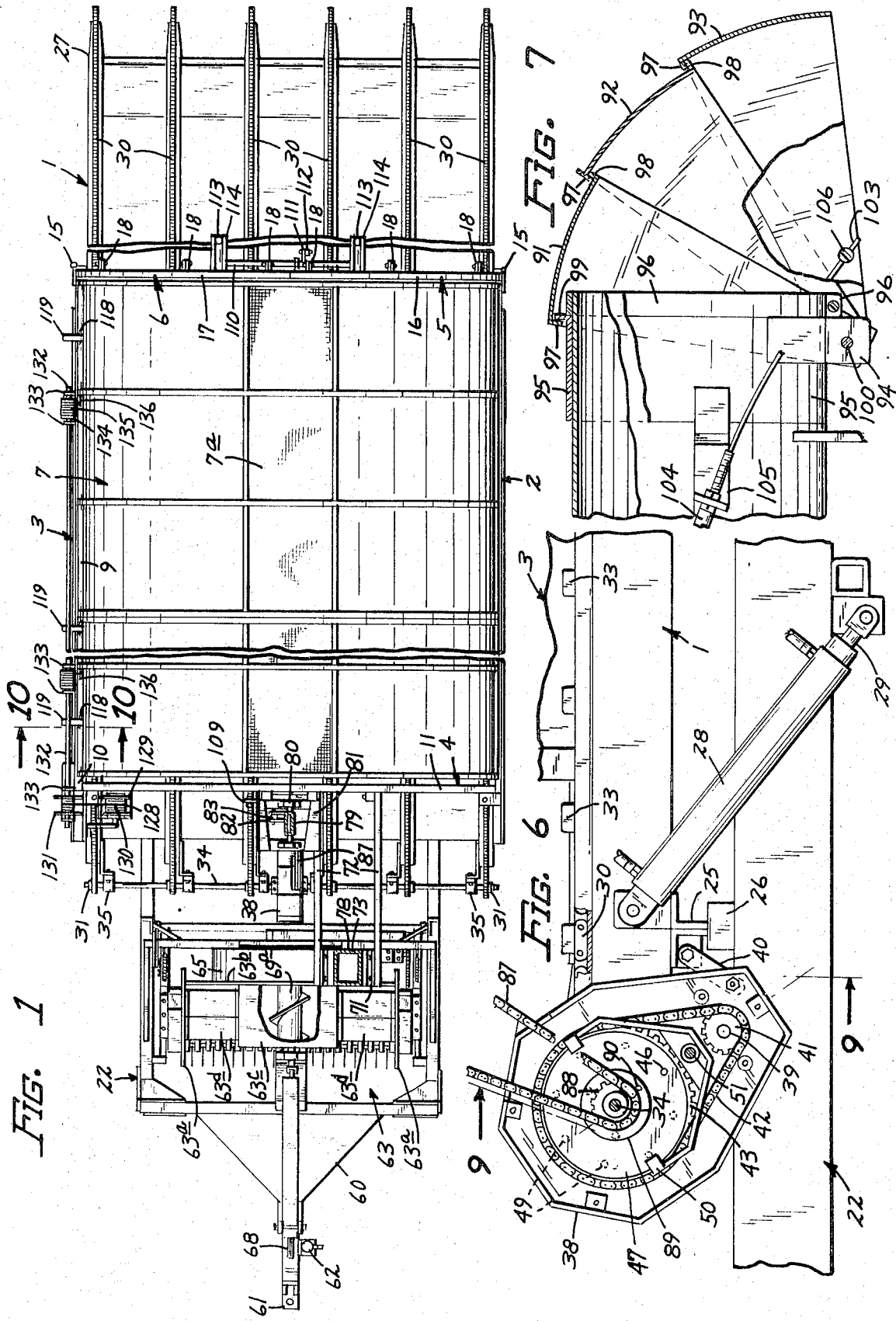

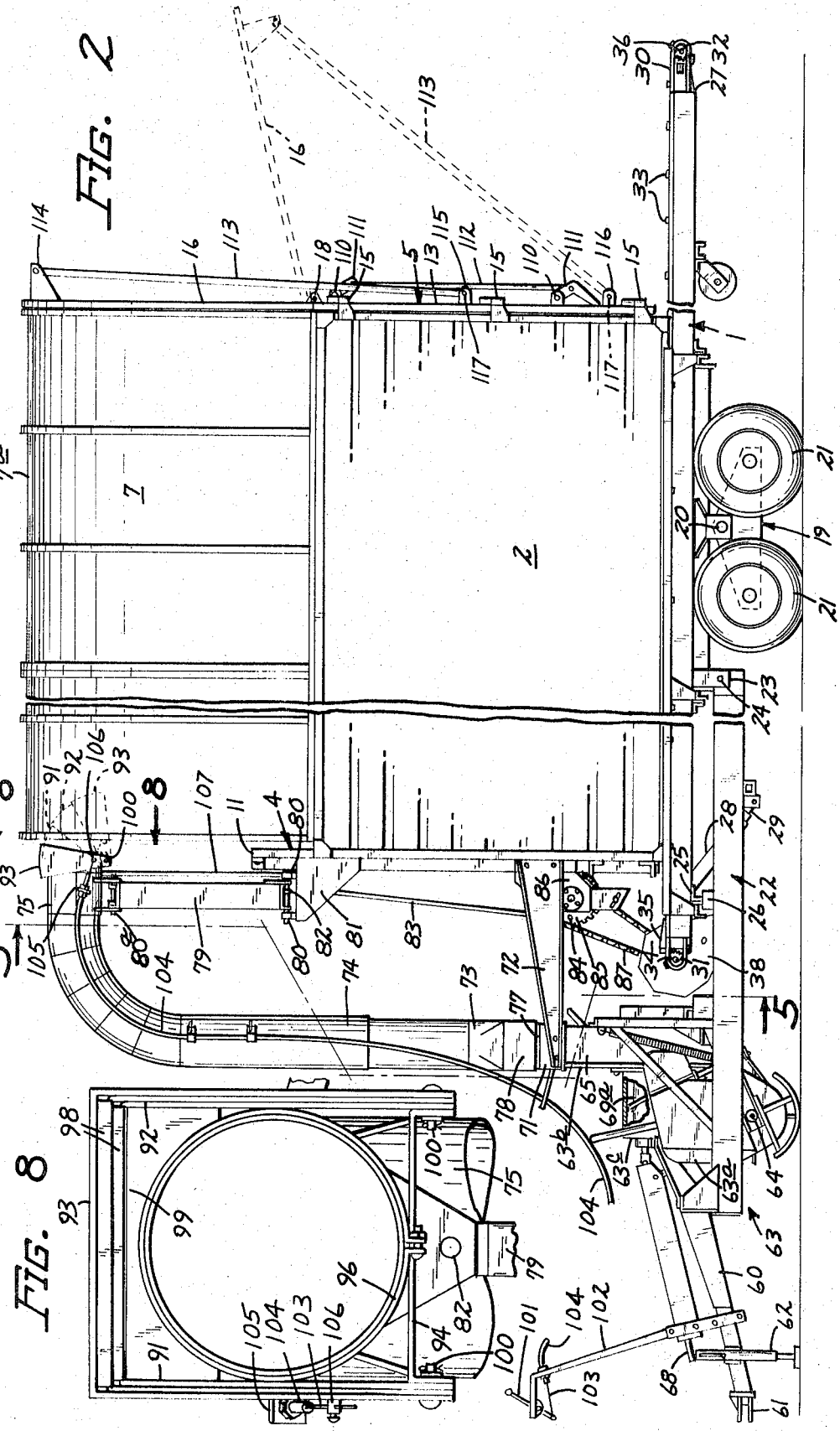

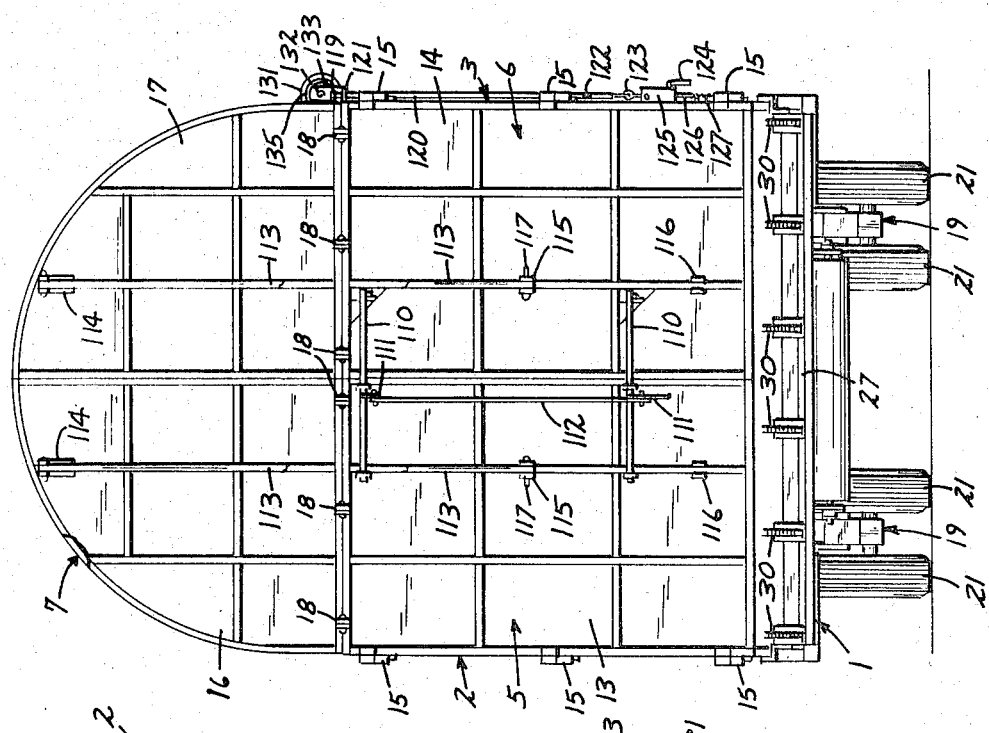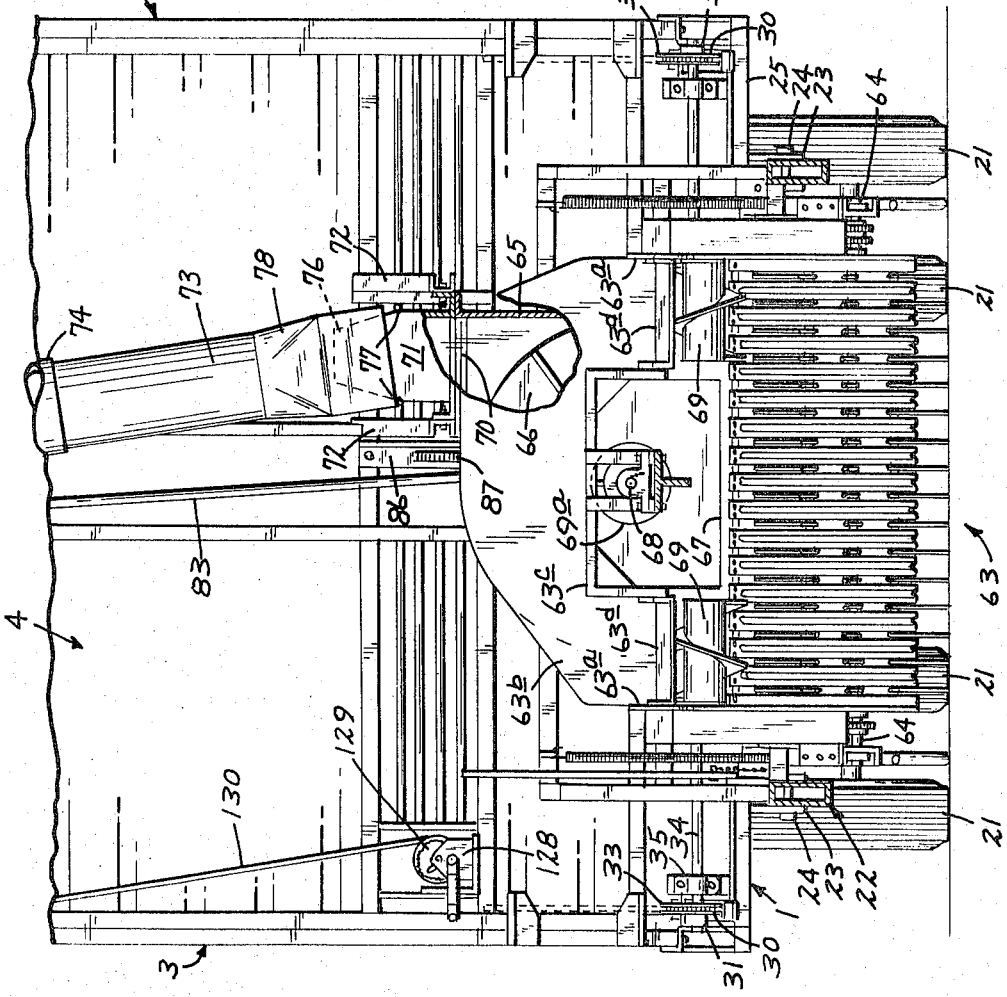

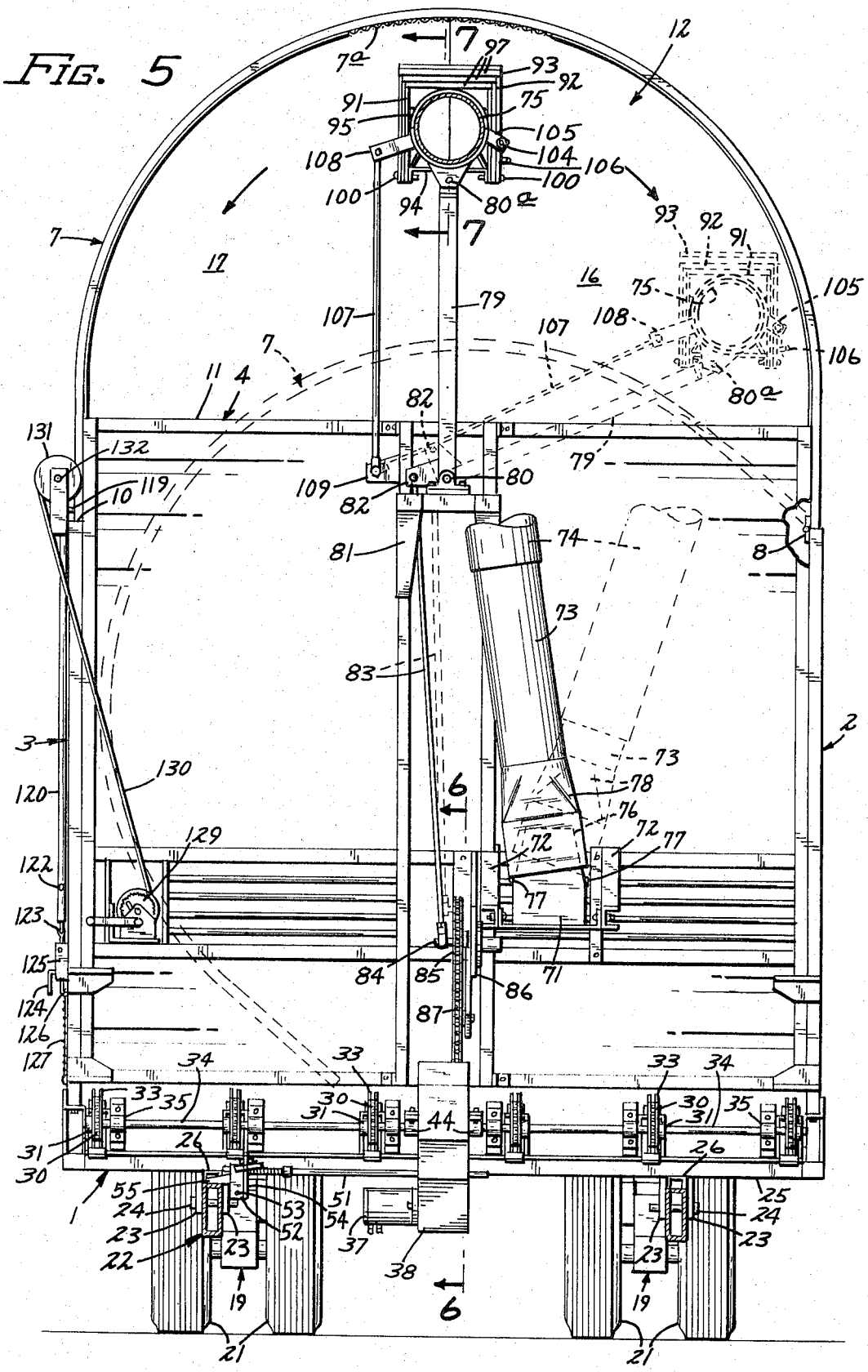

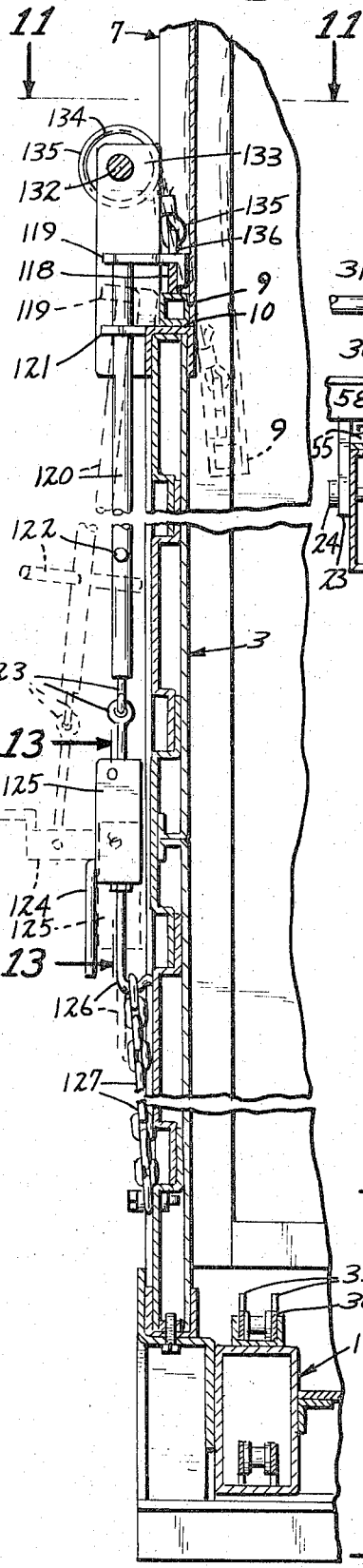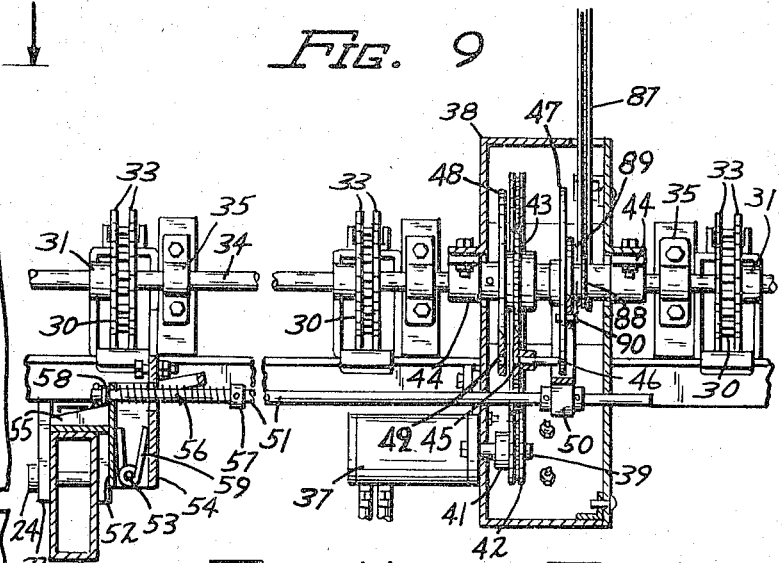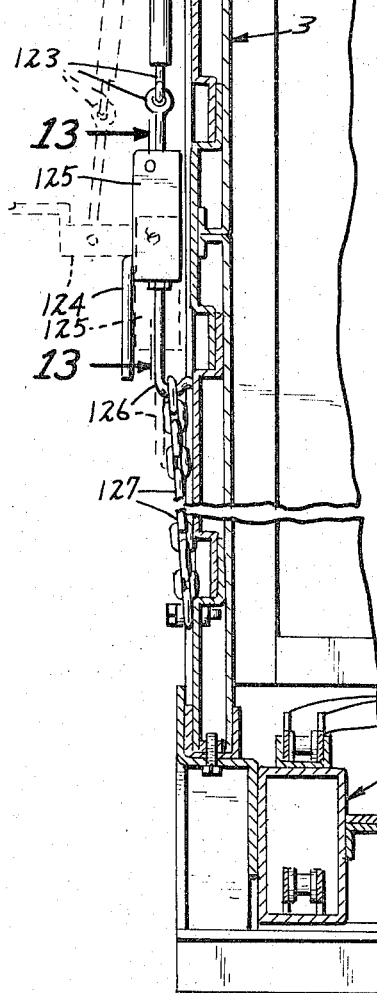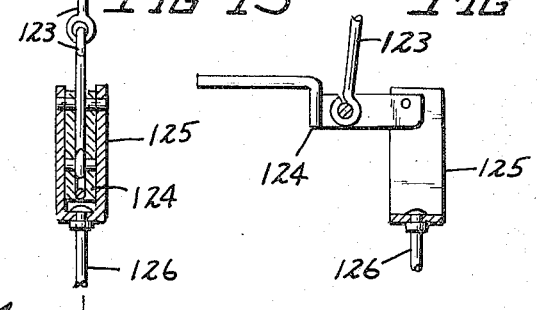

3,845,608

CONTINUOUS LOOSE HAY STACKING MACHINE

This application is a continuation-in-part of my application filed Apr. 12, 1972, Ser. No. 243,222, now abandoned, and entitled "Continuous Loose Hat Stacking Machine."

BACKGROUND OF THE INVENTION

The present machine is in the nature of an improvement over mobile stack forming machines of the general type disclosed in U.S. Pat. Nos. 2,955,403 and 3,556,327, these machines being adapted to be moved through a field to pickup mowed crop material and discharge the same into a stack forming container.

SUMMARY OF THE INVENTION

An important object of this invention is the provision of a stack forming machine including a mobile container defining a chamber and means for filling the chamber with crop material in a manner to dispose the material with a generally uniform degree of compactedness or density throughout the area of the chamber.

Another object of this invention is the provision of a stack forming machine having container forming wall structure including side walls, front and rear walls, a bottom wall and a top wall extending above the front and side walls, in which the top wall may be lowered between the side walls to reduce the overall height of the machine.

Another object of this invention is the provision of a stack forming machine as set forth including a crop material delivery conduit having a delivery end, and novel means for moving the delivery end of the conduit in a manner to distribute the material into the chamber defined by the container in predetermined directions.

To the above ends, I provide a mobile container defining a chamber having top and bottom walls, front and rear walls, and generally vertical and generally parallel side walls, the front wall having a material receiving opening adjacent the top wall. The machine includes an impeller and a conduit extending between the impeller and the opening for delivery of crop material to the chamber. The conduit includes a delivery or discharge end at the opening in the front wall, the delivery end being movable generally transversely of the container from one of the side walls to the other while directing the material in a rearward direction generally parallel to the side walls in all positions of transverse movement of the delivery end. The delivery end includes deflector mechanism movable between a position out of the flow path of material delivered from the conduit and other positions to deflect the flow of material downwardly into the container at various angles in planes parallel to the planes of the container side walls. Power operated mechanism is provided to impart said transverse movements to the delivery end of the conduit, and other mechanism is provided for moving the deflector mechanism to guide the flow of material in the desired directions during the transverse movements of the delivery end. Thus, in all positions of the delivery section of the conduit, and of the deflector mechanism, the flow of stack forming material delivered to the chamber occurs in vertical planes parallel to the planes of the side walls, so that the material is deposited generally uniformly from one side wall of the chamber to the other side wall thereof.

The top wall includes a screened or perforated portion for ventilation of the chamber, has one side edge hinged to the upper edge of one of the side walls, and is supported from the opposite side wall at its opposite side edge. Mechanism is provided for engaging and disengaging the top wall from its support and lowering and raising the top wall between the side walls. The rear wall is in the nature of a pair of doors each including upper and lower door sections hinged together on a horizontal axis, the lower sections of the rear doors each being hinged to the rear end of a different one of the side walls. The upper and lower door sections are normally locked in coplanar relationship. The upper sections may be swung outwardly and downwardly toward a generally horizontal position, and locked in place. When the upper sections are locked in this position and the top wall lowered into the container, the overall height of the machine is substantially reduced, permitting the machine to be moved under objects of restricted height, such as electrical or telephone wires, tree branches, and the like.

DESCRIPTION OF THE DRAWINGS

FIG. 1 is a view in top plan of a commercial embodiment of the invention, some parts being broken away and some parts being shown in section;

FIG. 2 is a view in side elevation, some parts being broken away;

FIG. 3 is a view in rear elevation, some parts being broken away;

FIG. 4 is an enlarged fragmentary view in front elevation, some parts being removed and some parts being shown in section;

FIG. 5 is an enlarged view, partly in front elevation and partly in section, taken on the irregular line 5—5 of FIG. 2;

FIGS. 6 and 7, sheet 1, are enlarged fragmentary details in section, taken on the lines 6—6 and 7—7, respectively, of FIG. 5;

FIG. 8, sheet 2, is an enlarged fragmentary view in rear elevation as seen from the line 8—8 of FIG. 2;

FIG. 9 is a fragmentary section taken substantially on the line 9—9 of FIG. 6;

FIG. 10 is an enlarged fragmentary section taken on the line 10—10 of FIG. 1;

FIG. 11 is a fragmentary view partly in top plan and partly in section, taken on the line 11—11 of FIG. 10;

FIG. 12 is a view corresponding to FIG. 11 but showing a different position of some of the parts;

FIG. 13 is a fragmentary section taken on the line 13—13 of FIG. 10; and

FIG. 14 is a fragmentary section taken on the line 14—14 of FIG. 13, but showing a different position of some of the parts.

DETAILED DESCRIPTION OF THE PREFERRED EMBODIMENT

Figure 15:
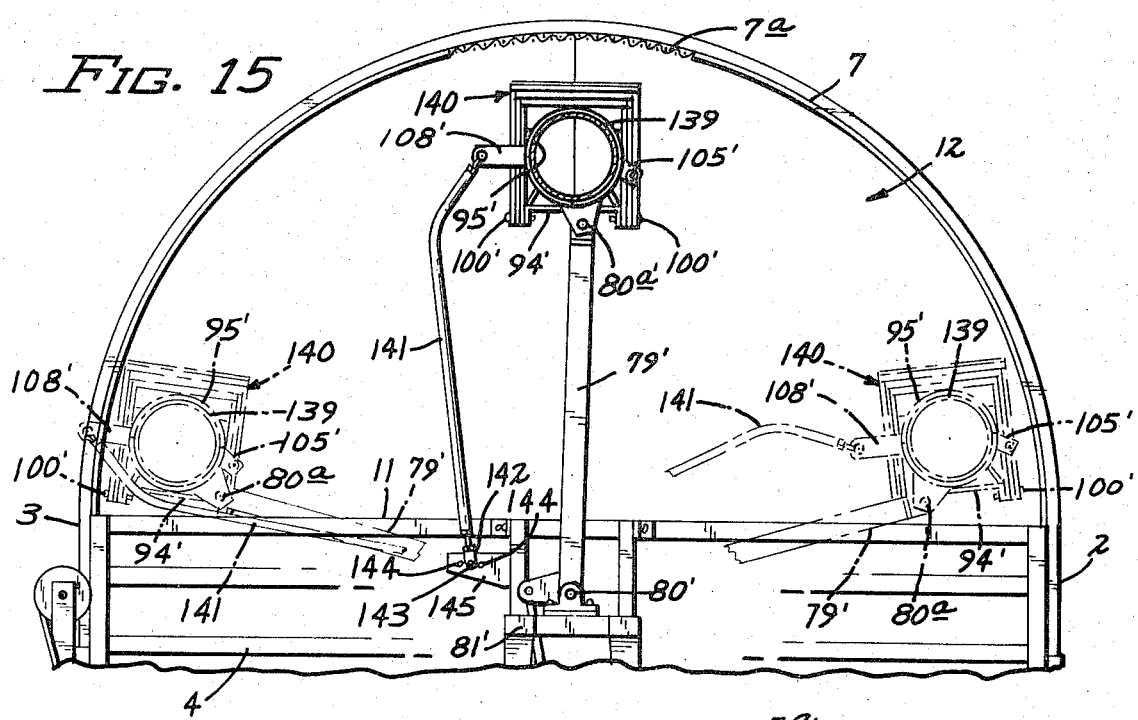
FIG. 15 is a fragmentary view corresponding to a portion of FIG. 5, but showing a modified arrangement.

In the drawings, a mobile stack forming container is shown as having wall structure defining a material receiving chamber and including an elongated generally flat bottom wall, indicated generally at 1, a pair of laterally spaced vertical and parallel side walls 2 and 3, a front wall 4, a rear wall comprising a pair of cooperating doors 5 and 6, and a cross-sectionally arcuate top wall 7 secured along one longitudinal edge to the upper edge of the side wall 2 by an elongated hinge 8. The opposite side edge of the top wall or roof 7 has secured thereto an elongated tubular brace member 9 that normally rests upon the upper edge 10 of the side wall 3, see particularly FIG. 10 and 11. In the embodiment illustrated, the top wall 7 has a transversely central portion or panel 7a that extends longitudinally of the top wall and which is of screen or perforated material to permit free movement of air between the chamber and the exterior of the container, for a purpose which hereinafter will become apparent. As shown in FIG. 5, the front wall 4 has an upper edge 11 that is disposed only a short distance above the hinge 8 and top edge 10 of the side wall 3, the upper edge 11 cooperating with the arcuate top wall 7 to define a semicircular inlet opening 12 to the interior of the container. The rear doors 5 and 6 comprise respective lower door sections 13 and 14 that are hinged to the rear ends of the side walls 2 and 3, respectively, as indicated at 15, the doors 5 and 6 including upper door sections 16 and 17, respectively, that are hinged to their respective door sections 13 and 14 on aligned horizontal axes, as indicated at 18.

The bottom wall 1 is mounted on a supporting frame structure 19 for pivotal movements about a horizontal axis extending transversely of the machine, by means of one or more pivot shafts 20, one of which is shown in FIG 2, the frame structure 19 being supported for movement over the ground by sets of pneumatic tire equipped wheels 21. Forwardly of the wheels 21, the bottom wall 1 is pivotally secured to the rear end of a generally rectangular subframe 22, by means of depending brackets 23 and aligned transverse pivot pins 24. The front end of the bottom wall 1 is provided with transverse angle members 25 that normally rest upon blocks or pads 26 at opposite sides of the subframe 22. The bottom wall 1 with its supporting structure 19 is preferably in the nature of a hay stack loader and unloader of the type fully disclosed in U.S. Patent to Boyd D. Schiltz 3,298,550, the bottom wall 1 being adapted to be moved between its horizontal position shown in FIG. 2 and a rearwardly and downwardly tilted loading position wherein the rear end 27 is disposed in close proximity to the ground, by means of a pair of fluid pressure cylinders 28 and cooperating piston rods 29 operatively connected to the bottom wall and subframe 22, see FIGS. 2 and 6. The bottom wall 1 includes a plurality of laterally spaced endless link chains 30 entrained over front and rear sprocket wheels 31 and 32 respectively, the chains 30 having feeding lugs 33 thereon. The sprocket wheels 31 are mounted on transverse shaft means 34 journalled in bearings 35 at the front end of the bottom wall 1, the rear sprocket wheels 32 being suitably journalled on shafts 36 at the rear end of the bottom wall 1.

Preferably, the conveyor chains 30 are driven in a direction to unload the container, through the shaft means 34 and sprocket wheels 31, by means of a conventional fluid pressure operated rotary motor 37 that is mounted on a transmission housing 38, the drive shaft 39 of the motor 37 being connected to the sprocket wheel shaft means 34 by transmission mechanism contained within the housing 38. The housing 38 is mounted on the front end of the bottom wall 1 by means of brackets 40. Within the housing 38, a drive sprocket 41 is mounted on the motor shaft 39 and has entrained thereover an endless link drive chain 42 that runs over a second sprocket wheel 43 that is journalled on the shaft means 34. It will be noted that the shaft means 34 extends transversely through the housing 38 and partially supports the same by means of shaft bearings 44 at opposite sides of the housing 38, see particularly FIGS. 5 and 9. The sprocket wheel 43 is provided with a boss having an opening 45 extending through the sprocket wheel 43 in the direction parallel to the axis thereof and in which is axially slidable a clutch pin 46 that is mounted on a disk 47 journalled on the shaft means 34. A drive plate 48 is rigidly mounted on the shaft 34 adjacent the sprocket wheels 43, and is provided with an opening 49 therethrough that is alignable with the opening 45 for reception of the clutch pin 46. The disk 47 is moved axially of the shaft 34, toward and away from the sprocket wheel 43, by means such as a shifter fork 50 that is mounted on an actuator rod 51 axially slidably mounted in suitable openings in the opposite side walls of the transmission housing 38. At one end, the rod 51 is operatively connected to one end of aactuator lever 52 that is pivotally mounted adjacent its opposite end, as indicated at 53, to a bracket member 54 rigidly connected to the front end of the bottom wall 1, see particularly FIG. 9. The lever 52 is provided with a foot 55 that engages the adjacent underlying portion of the subframe 22 when the crossbars 25 of the bottom wall 1 are in overlying engagement with the pads 26, to move the actuator rod 51 in a direction to withdraw the clutch pin 46 from the opening 49 in the drive plate 48. A coil compression spring 56 encompasses the actuator rod 51 between the lever 52 and a stop collar 57 on the rod 51. The spring 56 yieldingly urges the actuator rod 51 relative to the lever 52 and in a direction to cause withdrawal of the clutch pin 46 from the opening 49 in the drive plate 48. Movement of the actuator rod 51 in this direction is limited by a stop washer 58 between the lever 52 and the adjacent end of the rod 51. A heavy torsion spring 59 yieldingly urges the lever 52 in a direction to move the clutch pin 46 into operative engagement with the drive plate 48 when the bottom wall 1 is tilted so that the rear end thereof operatively engages the ground. Thus, when the bottom wall 1 is tilted, the conveyor chains 30 operate to unload material from the container.

At its front end, the subframe 22 is provided with a hitch frame 60 having a conventional coupler 61 at its front end for connection to the draw bar of a towing vehicle, such as a tractor, not shown. An adjustable leg 62 is mounted on the hitch frame 60 to support the front end of the machine when the same is disconnected from the towing vehicle. A conventional finger equipped pickup mechanism indicated generally at 63, is mounted on a shaft 64 journalled adjacent the front end of the subframe 22 for gathering cut crop, such as hay, from the ground, as the machine traverses a field. An impeller, including a housing 65 and a conventional impeller rotor 66 journalled therein, is mounted behind the pickup mechanism 63 for reception of crop material therefrom through an inlet opening 67 in the housing 65. The impeller rotor 66 is driven from the power takeoff mechanism of the towing vehicle, not shown, by means of a drive shaft 68. A pair of transversely extending screw conveyors 69 disposed above the pickup mechanism 63 aid in feeding material to the opening 67. A third screw conveyor 69A is connected to the drive shaft 68 and extends in a direction normal to the axis of the screw conveyors 69, and through the inlet opening 67. Preferably, the conveyors 69, and through the inlet opening 67. Preferably, the conveyor 69A is axially aligned with the impeller rotor 66 and forms a drive connection therebetween and the drive shaft 68. A forwardly opening hood, for aiding in guiding material toward the impeller inlet opening 67, includes side walls 63a, rear wall portions 63b attached to the impeller housing 65 at opposite sides of the opening 67, and generally horizontal top wall members 63c and 63d. The top wall member 63c is inverted and generally U-shaped and overlies the screw conveyor 69a, the same being secured to the impeller housing 65 and projecting forwardly therefrom. The top wall members 63d are preferably each secured to a different one of the side walls 63a and each overlie a different one of the screw conveyors 69, see FIG. 4. The pickup mechanism 63 and screw conveyors 69 are driven from the drive shaft 68 by conventional and well known transmission mechanism, not shown. The impeller rotor 66 is rotated in a direction to impel the cut crop upwardly through a discharge opening 70 in the housing 65.

Conduit means for delivering material from the impeller to the interior of the container through the opening 12 thereof includes; a tubular fitting 71 that is mounted on the front ends of a pair of laterally spaced arms 72 that project forwardly from the front wall 4; a rigid lower conduit section 73; and a rigid upper conduit section 74 curved to provide a rearwardly projecting delivery section 75 disposed to direct material through the opening 12 on an axis parallel to the planes of the side walls 2 and 3. The tubular fitting 72 has an upwardly tapering upper end portion 76, and a pair of rods 77 are welded or otherwise rigidly secured one each to each side of the fitting 71 just below the tapered portion 76 thereof. The lower conduit section 73 has an enlarged lower end portion 78 which is received over the tapered portion 76, the extreme lower end of the enlarged portion 78 resting on one or both of the rods 77. The upper conduit section is telescopically slidably received over the lower conduit section 73. It should be here noted that, when the bottom wall 1 of the container is in its position shown in the drawings, the fitting 71 rests on the impeller housing 65 in alignment with the discharge opening 70 thereof.

Means for supporting the upper conduit section 74 with its rearwardly projecting delivery section 75 comprises a rigid supporting leg 79 having its lower end pivotally mounted on a hinge member 80 on a horizontal axis extending longitudinally of the machine. The hinge member 80 is supported by a frame structure 81 carried by the front wall 4 of the container. At its upper end, the leg 79 is pivotally connected to a second hinge member 80a on an axis parallel to the axis of the pivotal connection with the hinge member 80, the hinge member 80a being rigidly secured to the delivery section 75. The leg 79 supports the upper conduit section 74 with its delivery section 75 for swinging movements laterally of the container so that the delivery section 75 describes an arc of movement between opposite portions adjacent opposite sides of the container, as partly indicated by full and dotted lines in FIG. 5. During such movement, the conduit sections 73 and 74 partake of rocking movements with respect to the fitting 71, so that the lower end portion 78 of the lower conduit section 73 is supported alternately by opposite ones of the rods 77, see FIG. 5. It will be also noted that during movement of the conduit sections from side to side of the container, the upper conduit section 74 partakes of considerable axial movement relative to the lower conduit section 73. It will be appreciated that the dotted line showing in FIG. 5, of the delivery section 75, represents a position thereof approaching the limit of oscillatory movement thereof in one direction.

The leg 79 is provided adjacent its lower end iwth a laterally outwardly projecting foot 82 to which is pivotally secured the upper end of an elongated pitman arm 83 having its lower end pivotally connected to a crank pin 84 that projects laterally outwardly from one side of a sprocket wheel 85 that is rotatably mounted on a bearing bracket 86 carried by the supporting structure 81. The sprocket wheel 85 is driven by a link chain 87 entrained thereover and over another sprocket wheel 88 journalled on the shaft means 34 within the transmission housing 38. The sprocket wheel 88 is provided with a clutch disk 89 having an aperture therethrough for reception of a clutch pin 90 that projects in a direction axially outwardly from the disk 47, in a direction opposite that of the clutch pin 46. As shown in FIG. 9, when the container bottom wall 1 is in its horizontally disposed position, the shifter fork 50 positions the disk 47 so that the pin 46 is retracted from the opening 49 in the drive plate 48 and the pin 90 is received in the opening in the clutch disk 89 to drive the sprocket wheels 88 and 86 to impart oscillatory or swinging movements to the leg 79 through the pitman arm 83.

For the purpose of guiding material discharged into the interior of the container, in the most advantageous manner, I provide a deflector comprising a plurality of nesting deflector sections 91, 92 and 93 pivotally secured to a bracket 94 that is welded or otherwise rigidly secured to a mounting sleeve 95 rotatably encompassing the extreme rear end of the delivery section 75. At its extreme rear end, the delivery section 75 is provided with a clamping ring 96 for holding the mounting sleeve 95 against axial movement rearwardly of the delivery section 75. Each of the deflector sections 91, 92 and 93 are provided with inturned flanges 97, the flanges 97 of the sections 92 and 93 being engagable with an upstanding flange 99 on the mounting sleeve 95, all to limit swinging movements of the deflector sections 91, 92 and 93 in a downward direction relative to the delivery conduit section 75. With reference to FIG 7, it will be noted that the deflector sections are pivotally mounted to the bracket 94 by aligned pivot pins 100. As shown particularly in FIGS. 2 and 7, the deflector sections 91, 92 and 93 are movable between a raised position, as shown by full lines in FIG. 2, and extreme lowered positions as shown in FIG. 7. In the raised, fully nested position of the deflector sections 91–93 the sections are disposed completely out of the path of flow of material being discharged to the delivery conduit section 75 to the interior of the container. When the deflector sections 91, 92 and 93 are lowered to their position of FIG. 7, they cooperate to direct discharged crop material in a direction substantially normal to the direction of flow of the material thorugh the delivery section 75. Means for adjustably moving the deflector sections 91, 92 and 93 between their raised and fully lowered positions, comprises an adjustment lever 101 mounted on the upper end of a bracket 102 that is rigidly secured to and projects generally upwardly from the hitch frame 60, see FIG. 2. The lever 101 is connected to one end of a Bowden wire 103 that extends through a hollow flexible tube anchored at one end to the bracket 102 and at its other end to a bracket 105 secured to the mounting sleeve 95, the opposite end of the Bowden wire 103 being pivotally anchored to the deflector section 93, as indicated at 106.

A rigid control arm 107 is disposed in laterally spaced generally parallel relationship with the leg 79, and is pivotally connected at its outer end to the radially outer end of a bar 108 that is rigidly secured at its inner end to the mounting sleeve 95. At its inner end, the control arm 107 is pivotally connected to a bracket 109 that is welded or otherwise rigidly secured to the frame structure 81, the axes of pivotal connection of the opposite ends of the arm 107 to the bar 108 and bracket 109 being parallel to the axes of the hinge members 80 and 82 as well as the axis of the delivery section 75. The control arm 107 rotates the mounting sleeve 95 and deflector sections carried thereby relative to the delivery section 75 during oscillatory movements of the delivery section 75 to maintain the axis of the pivot pins 100 in a horizontal disposition in all positions of movement of the delivery section 75. Thus, when the deflector sections 91, 92 and 93 are moved into the flow path of material discharged through the conduits, the flow of material will be directed angularly downwardly into the interior of the container at various desired angles relative to the planes of the front and rear walls of the container but always in a plane parallel to the planes of the side walls 2 and 3. With this arrangement, material discharged into the container is directed with equal force along the side walls 2 and 3 as it is in the central portion of the container transversely thereof, so that the material is deposited with a substantially uniform degree of compactness therein.

In one method which may be used to fill the container with crop material, to form a stack thereof, the deflector sections 91–93 are preferably initially set to direct material angularly rearwardly and downwardly so that the crop material is first discharged to the rear bottom portion of the chamber. When a substantial quantity has been discharged to this portion of the chamber, the operator then manipulates the lever 101 to set the deflector sections 91, 92 and 93 to their position of FIG. 7 wherein the flow of material is directed vertically downwardly adjacent the inner surface of the front wall 4 to partially fill that portion of the chamber. Thereafter, the deflector sections may be manipulated to direct the crop material toward the longitudinally central portion of the chamber to partially fill that portion. This routine may be repeated until the container is filled to at least the level of the upper front wall edge 11. In practice, it has been found that with the use of above described conduit and deflector arrangement, the crop material is packed in the container with a uniform density over the entire area of the chamber; and that a substantially greater quantity of material can be stacked in the container of a given size than when the material is discharged thereinto through a relatively stationary delivery conduit. It will be noted that, during filling of the container chamber, air discharged into the chamber with the crop material flows outwardly, for the most part, through the screen or perforated panel 7a of the top wall 7, some of the air flowing outwardly through the opening 12 of the front wall 4.

During the filling of the container, the rear doors 5 and 6 are closed, and locked in a closed position by suitable and well known means such as a pair of locking bolts 110 having locking levers 111 thereof connected by a connector rod 112. The upper door sections 16 and 17 are held in closed coplanar relationship with their respective lower door sections 13 and 14 by means of a pair of elongated support rods 113 pivotally connected at their upper ends to the outer ends of rearwardly projecting brackets 114. At their lower ends, the rods 113 are adapted to be received between upper and lower pairs of apertured locking lugs 115 and 116 respectively and releasably locked in place by pins 117 extending through apertures in the pairs of lugs 115 and 116 and like openings in the lower ends of the rods 113. As shown in FIG. 3, and by full lines in FIG. 2, when the lower ends of the rods 113 are locked to the lugs 115, the upper door sections 16 and 17 are held in coplanar relationship with their respective lower door sections 13 and 14. When the lower ends of the support rods 113 are locked between their respective lower lugs 116, the upper door sections 16 and 17 are disposed in downwardly and rearwardly extending angularly spaced relationship to the positions of coplanar relationship with their respective lower door sections, as shown by dotted lines in FIG. 2, for a purpose which will hereinafter become apparent.

When the container has been filled to the desired extent, the fluid pressure operated motor 37 is de-energized and the machine is moved to the desired location for discharge of the formed stack from the container. At said desired location, the locking bolts 110 are released, and the rear doors 5 and 6 are swung open on their hinges 15, after which fluid under pressure is delivered to the cylinders 28 to tilt the container rearwardly. As the container is tilted rearwardly, the torsion spring 59 moves the lever 52 in a direction to cause the drive plate 48 to be engaged by the clutch pin 46. Energization of the motor 37 will then cause the several chains 30 to move in a direction to rearwardly unload the formed stack from the container. The stack is unloaded in the manner disclosed in the above-mentioned U.S. Pat. No. 3,298,550.

In its normal operating condition, the container is of such height as to prevent the same from being moved under some electrical and telephone wires, overhanging tree branches, bridges, and other structures. To enable the machine to be moved under such obstacles, the arcuate top wall 7 is arranged to be moved downwardly about the axis of the hinge 8 into the interior of the container. The tubular brace member 9, as above mentioned, normally rests on the upper edge 10 of the side wall 3, and is releasably held against laterally inward movement by means of a plurality of locking lugs or strike plates 118 projecting upwardly from the tubular brace member 9, and a like plurality of cooperating latch hooks 119 projecting laterally from vertically extending actuator rods 120 slidably journalled in brackets 121 secured to the upper edge 10 of the side walls 3, a pair of each of the strike plates 118 and latch hooks 119 being shown. One of the rods 120 and brackets 121 is shown in FIGS. 10–12. Each of the latch rods 120 is provided with a transverse handle 122 whereby the latch rods 120 and their respective latch hooks 119 may be rotated. The lower ends of the latch rods 120 are connected, by links 123, to locking levers 124 that are pivotally mounted in U-shaped body members 125. The body members 125 are secured to the lower portions of the side wall 3 by hooks 126 and link chains 127, the lower ends of the link chains 177 being bolted or otherwise rigidly secured to the side wall 3. As shown in FIGS. 10-14, when it is desired to lower the top wall 7 into the interior of the container, the levers 124 are pivotally moved from their over dead center locking positions shown by full lines in FIGS. 5 and 10, to their latch hook release positions shown by dotted lines in FIG. 10 and by full lines in FIG. 14. Then, by means of the handles 122, the latch rods 120 and their respective latch hooks 119 are rotated on the axes of the latch rods 122 move the latch hooks 119 out of latching engagement with their respective strike plates 118, and then axially downwardly, and rotated into camming engagement with the laterally outer surface of the tubular brace member 9 as shown by dotted lines in FIGS. 10 and 12. The latch hooks 119 are then further rotated in a manner to impart relative movement between the upper edge 10 of the side walls 3 and the brace member 9 and adjacent edge of the top wall 7, by cam action between the latch hooks 119 and brace member 9, to displace the brace member 9 laterally inwardly of the wall 3 to permit downwardly swinging movement of the top wall 7 into the container. There is sufficient resilient flexibility in the top wall 7 to make such displacement a relatively easy matter.

The top wall 7 is raised and lowered about the axis of its hinge 8 by means of a hand crank operated winch 128 mounted on the framework of the front wall 4, the winch including a rotary drum 129 upon which is wound a length of flexible cable 130. The cable 130 is also partially wound on a second drum 131 that is mounted on a shaft 132 extending longitudinally of the side wall 3 and above the level of the upper edge 10 thereof, the shaft 132 being journalled in longitudinally spaced bearing brackets 133 secured to the upper edge portions of the container side walls 3. A plurality of other drums or reels 134 are rigidly mounted on the shaft 132 in axially spaced relationship thereon and have wound thereon cables 135, these cables each having one end ridgely secured to its respective drum and each having an opposite end connected to one of a plurality of anchoring pins 136 secured to the top wall 7. When the top wall brace member 9 and adjacent edge of the top wall 7 is laterally inwardly displaced from the side wall 3, the winch 128 is operated to lower the top wall 7 into the interior of the container, when the container is otherwise empty. With the top wall 7 thus lowered, the upper door sections 16 and 17 in their lowered angularly displaced positions, as shown by dotted lines in FIG. 2, and the conduit sections 73, 74 and 75 moved to one of their extreme positions of lateral movement, one of which is shown by dotted lines in FIG. 5, the entire machine is of such height as to permit the same to be moved under low overhead obstacles. When the machine is again clear of such obstacles, it is only necessary to move the latch hooks 119 to their dotted line positions of FIGS. 10 and 12, and operate the winch 128 to raise the top wall 7 until the tubular brace member 9 thereof is raised just above the level of the top edge 10 of the side wall 3. At this point, the direction of pulling effort of the cables 135 and the resilience of the top wall 7 will cause the brace member 9 and adjacent edge of the top wall 7 to move laterally outwardly to overlying relationship with the upper edge 10 of the side wall 3. The winch 128 is then operated in the reverse direction to permit the tubular brace member 9 to rest upon the upper edge 10, and the latch hooks 119 are rotated into locking engagement with their respective strike plates 118. When the rear door sections 16 and 17 are raised to their vertical positions and locked in place, the container is ready to receive crop material to form a stack thereof.

From the above, it will be seen that, in all positions of the delivery section and deflector, the flow of stack forming material delivered to the interior of the container occurs in vertical planes parallel to the planes of the container side walls 2 and 3. The coordinated oscillatory movements of the leg 79, conduit sections 73, 74 and 75, and deflector membes 91, 92 and 93 result in a substantially uniform deposition of the crop material over the entire area of the container and especially from one side wall of the container to the opposite side wall thereof. This uniformity is not obtained in stack forming machines wherein the crop material along with an air stream is discharged into the container from a fixed or stationary discharge conduit having direction controlling means. In such machines, the air stream and material carried thereby is, for a part of the filling operation, directed against the side walls of the container at angles of substantial magnitude and at times approaching perpendicularity to the side walls. During these periods, impingement of the air stream against the side walls results in countercurrents of air which tend to prevent uniform deposition of the material in an area starting a short distance from the side walls and extending laterally inwardly up to 2 or 3 feet away. Thus, variations in both level and density of material occur from one side wall of the container to the opposite side wall thereof. Then, when the formed stack is removed from the container, and deposited on the ground, subsequent settling of the stack results in a top surface having hollow portions which prevent proper drainage of rainwater or melting ice or snow from the stack.

In my above-described machine, the delivery end section 75 and deflector sections 91, 92 and 93 cooperate to direct the concurrent flow of crop material and air in directions parallel to the side walls 2 and 3 during the complete filling operation. With the deflector sections in the extreme lowered position, the material and air is directed in a path substantially parallel to the front wall 4. By maintaining the direction of air and material flow in vertical planes parallel to the side walls 2 and 3, there are no significant countercurrents of air generated by the impingement of the air stream upon the side walls to interfere with the uniform deposition of material over substantially the entire area of the container. During the filling of the container, when the crop material is directed toward the rear container wall, impingement of the air stream against the rear wall results in some countercurrents of air being formed. However, the velocity of the air stream as it flows the entire length of the container is diminished by friction and divergence to such an extent that air countercurrents from the rear wall are not so extensive as to create substantial disuniformity in the density of material near the rear wall. Also, in my machine, the air stream and accompanying crop materials are thereby being directed for the greatest part of the filling operation toward previously deposited crop material whose rough surface acts to reduce the velocity and energy of the air stream and thereby aids in achieving a more uniform stack. The crop material carried by the air stream is thrown directly against other material giving increased compaction and, to an appreciable degree, the stems are intertwined to produce a more stable stack.

Figure 16:
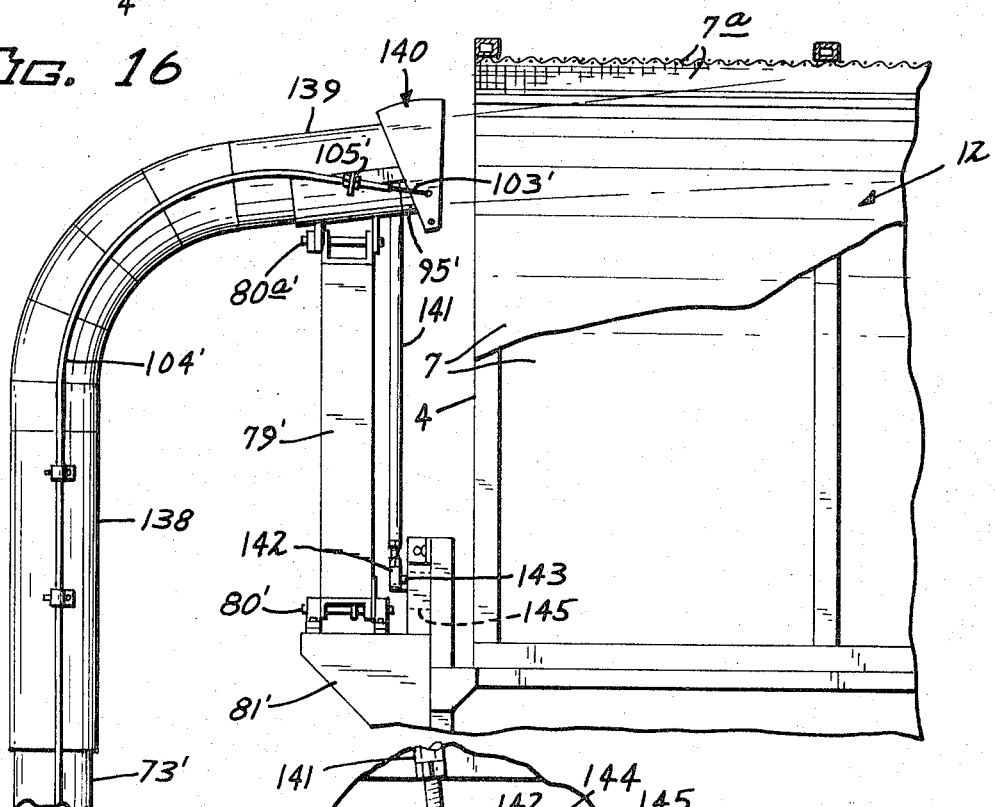
FIG. 16 is a fragmentary view corresponding to a portion of FIG. 2, but showing the modified arrangement of FIG. 15, some parts being broken away and some parts being shown in sections.
Figure 17:
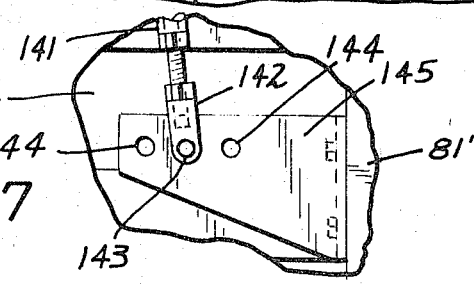
FIG. 17 is an enlarged fragmentary view in front elevation, corresponding to a portion of FIG. 15.

Description of the Modified Arrangement of FIGS. 15–17

In order to obtain a more uniform density of a stack within the container, so that the stack has a density at the extreme sides thereof as it has intermediate the sides, I have found it advantageous to provide a slight deviation in the path of travel of the hay discharged from the delivery conduit from a direction absolutely parallel to the side walls 2 and 3 of the containers, when the delivery section of the discharge chute is disposed at the extreme limits of transverse movement thereof relative to the container.

In the modified arrangement illustrated in FIGS. 15–17, the container may be assumed to be identical to that of FIGS. 1–14, the same being shown as having opposite side walls 2 and 3, a front wall 4, and a cross-sectionally arcuate top wall 7 having a perforate or screened portion 7a, the front wall 4 having an upper edge 11 which defines the lower edge of an opening 12 to the interior of the container.

A lower conduit section 73' is identical to the conduit section 73 and has mounted thereon an upper conduit section 138 which is similar to the upper conduit section 74, but which differs therefrom in having its rearwardly projecting delivery section 139 disposed to slope slightly upwardly and rearwardly relative to the container when the section 139 is disposed in its generally central position of transverse movement relative to the container, as shown by full lines in FIG. 15. Like the section 74, the upper conduit section 138 is supported by a rigid supporting leg 79' having its lower end pivotally mounted on a hinge member 80' on a horizontal axis extending longitudinally of the machine. The hinge member 80' is supported by a frame structure 81' carried by the front wall 4 of the container. At its upper end, the leg 79' is pivotally connected to a second hinge member 80a' on an axis parallel to the axis of the hinge member 80', the hinge member 80a' being rigidly secured to the delivery section 139. The leg 79' supports the upper conduit section 138 in the same manner as the leg 79 supports the upper conduit section 74, for swinging movements laterally of the container, so that the delivery section 139 describes an arc of movement between opposite positions adjacent opposite sides of the container, as partly indicated by full and broken lines in FIG. 15. Rocking movements are imparted to the leg 79' by mechanism identical to that associated with the leg 79.

A deflector, indicated generally at 140, may be assumed to be identical to the deflector including the deflector sections 91, 99, and 93, the sections of the deflector 140 being pivotally mounted on a bracket 94', identical with the bracket 94 and welded to a mounting sleeve 95'. As shown, and as described in connection with the structure of FIGS. 1–14, the sections of the deflector 140 are pivotally connected to the bracket 94' by aligned pivot pins 100' disposed on an axis extending transversely of the axis of the end section 139. The sections of the deflector 140 are adjusted about the aligned axes of the pins 100' by a Bowden wire 103' connected at one end to one of the sections of the deflector 140 and mounted in a flexible tube 104' supported from the delivery end section 139 by means of a bracket 105'.

A rigid control arm 141 operates in a manner similar to that of the control arm 107, the arm 141 being pivotally connected at its upper or outer end to the radially outer end of a bar 108' that is rigidly connected at its inner end to the deflector mounting sleeve 95'. The axis of pivotal connection between the control arm 141 and the bar 108' is parallel to the axes of pivotal connection of the opposite end of the leg 79' with the hinge members 80' and 80A'. The control arm 141 has a lower or inner end member 142 that is provided with a pivot shaft or pin 143 that is selectively receivable in any one of a plurality of laterally spaced openings 144 in a bracket 145 mounted on the frame structure 81', the bracket 145 being similar to the bracket 109. It will be noted that the axis of the pivot pin 143 is parallel to the axis of pivotal connection between the outer end of the control arm 141 and the bar 108', when the pivot pin 143 is disposed in any one of the openings 144 in the bracket 145.

Due to the fact that the delivery portions 75 and 139 are tubular, and that the direction controlling deflectors occupy space laterally outwardly of their respective delivery ends 75 and 139, hay being delivered to the container does not always become as densely packed against the side walls 2 and 3 as it does several inches laterally inwardly of the side walls 2 and 3. Hence, in order to obtain density in the stack being formed in the container in the few inches adjacent the side walls 2 and 3 as uniform as the rest of the stack, lateral adjustment of the lower or inner end of the control arm 141 may be made to impart such rotation to the deflector 140 relative to the rearwardly directed tubular portion 139 to impart a relatively small angular displacement to the mounting sleeve 95' and deflector 140 toward the planes of the side walls 2 and 3 when the delivery end section 139 is in its opposite limits of transverse movement, as shown by broken lines in FIG. 15. By placing the pivot pin 143 in any selected one of the openings 144, the angular displacement of the mounting sleeve 95' and deflector 140 may be slightly varied as desired. It will be appreciated that by connecting the lower end member 142 of the control arm 141 at a given one of the openings 144, the mounting sleeve 95' and the deflector 140 will remain in a constant attitude with respect to the side walls 2 and 3 in the same manner as the corresponding portions above described in connection with the form of the invention of FIGS. 1–14.

I have found that, as a result of the uniform deposition and compaction of the material achieved through use of my invention, mechanical means for further compacting the crop material, in the container, is unnecessary.

While I have shown and described a commercial embodiment of my continuous loose hay stacking machine, and a single modified arrangement thereof, it will be understood that the same is capable of further modification without departure from the spirit and scope of the invention, as defined in the claims.

What is claimed is:

1. A stack forming machine comprising:

a. mobile wall structure forming a container including top and bottom walls, generally vertical side walls disposed in spaced apart generally parallel relationship longitudinally of the direction of travel of the machine, and front and rear walls;
b. said wall structure defining an opening through said front wall adjacent the top wall;
c. means for loading the container with crop material and including an impeller mechanism and conduit means extending from the impeller mechanism to said opening;
d. said conduit means including a movable delivery section disposed to direct material through said opening toward said rear wall on an axis extending parallel to said side walls;
e. and support means mounting said delivery section for movements generally transversely of the container and for holding said delivery section in a substantially constant attitude relative to the container in all positions of transverse movement of said delivery section, whereby said material is discharged into the container in directions parallel to the planes of said side walls.

2. The stack forming machine defined in claim 1 in which said movable delivery section includes a rearwardly projecting portion and a guide portion adjustably movable relative to said rearwardly projecting portion in directions to vary the direction of discharge movement of said material in planes parallel to said planes of the container side walls.

3. The stack forming machine defined in claim 2 in which said guide portion comprises a deflector pivotally mounted on the rearwardly projecting portion on a horizontal axis extending transversely of the container, for movements between a raised position above said rearwardly projecting portion out of the path of discharged material and an extreme lowered material guiding position directing said material downwardly into said container, characterized by means for moving said deflector and holding the same in various positions of movement between said raised and extreme lowered positions thereof.

4. The stack forming machine defined in claim 1 in which said conduit means comprises a rigid tube extending generally upwardly from said impeller, said tube having an upper end extending rearwardly to provide said delivery section and a lower end mounted for reception of material from said impeller and for swinging movements of said conduit means laterally of said container.

5. The stack forming machine defined in claim 4 in which said movable delivery section includes a deflector and a mounting sleeve rotatively encompassing said upper end of said tube, said deflector being pivotally mounted on said sleeve for rotation therewith on the axis of said upper end and for independent swinging movement on a generally horizontal axis extending transversely of said container and said upper end of the conduit and between a raised position above the path of travel of material discharged from said tube and an extreme lowered position for directing material downwardly into said container directly below the rear end of said tube, characterized by means for moving said deflector and holding the same in various positions of movement between said raised and extreme lowered position thereof.

6. The stack forming machine defined in claim 5 in which said support means comprises a rigid leg having an upper end pivotally connected to said upper end of the tube, and a lower end, characterized by means pivotally supporting the said lower end from said wall structure on an axis parallel to the axis of pivotal connection of its upper end to said tube and to the axis of said delivery section, and a control arm disposed in laterally spaced generally parallel relation to said leg, said control arm having a lower end pivotally mounted on said last mentioned means and an upper end operatively pivotally connected to said deflector mounting sleeve on axes parallel to the mounting axis of said leg.

7. The stack forming machine defined in claim 6, characterized by power operated means including a crank and a cooperating pitman arm connected to said leg for imparting oscillatory movement to said leg and said tube generally transversely with respect to said container.

8. The stack forming machine defined in claim 4 in which said tube comprises a pair of cooperating upper and lower tube sections one of which is slidably telescopically received in the other thereof, the upper tube section having its upper end extending rearwardly.

9. The stack forming machine defined in claim 1 in which said top wall has opposite side edges each normally disposed adjacent the upper edge of a different one of said side walls, and a lognitudinal portion intermediate said side edges normally disposed at a higher elevation than said side edges, characterized by means mounting said top wall to one of said side walls for movements between a normally raised operative position, wherein both of said side edges are disposed adjacent said side wall upper edges, and a lowered storage position between said side walls and between said front and rear walls.

10. The stack forming machine defined in claim 9 in which said last mentioned means comprises a hinge pivotally connecting one side edge of the top wall to the upper edge of the side wall adjacent said one side edge, and means for releasably locking the opposite side edge of the top wall to the upper edge of the other one of said side walls.

11. The stack forming machine defined in claim 9 in which said rear wall comprises upper and lower door sections, said lower section being hinged to one of said side walls on a generally vertical axis, and means connecting said upper and lower sections together for movements of the upper door section between a raised operative position in door closed relationship with said top wall, when said top wall is raised to its operative position, and a lowered position in downwardly displaced relation to said raised position thereof.

12. The stack forming machine defined in claim 11 characterized by means for releasably locking said upper rear door section selectively in said raised and lowered position thereof.

13. The stack forming machine defined in claim 9 in which said rear container wall comprises a pair of doors each including a pair of upper and lower door sections hinged together on a generally horizontal axis, said lower door sections each having a laterally outer edge pivotally connected to a different one os said side walls on a generally vertical axis, and means for releasably locking said doors in generally coplanar door closed relationship.

14. The stack forming machine defined in claim 13, characterized by means including a pair of support members for releasably locking said upper door sections selectively in operative generally vertical positions above their respective lower door sections, and lowered inoperative positions angularly downwardly displaced from said operative positions thereof.

15. The stack forming machine defined in claim 1 in which said support means includes a control member connected to said delivery section and responsive to said generally transverse movement of the delivery section to opposite limits of movement thereof to impart a relatively small angular displacement to the delivery section from parallel and toward the plane of the container side wall adjacent the delivery section at each limit of said generally transverse movement, whereby to more densely pack the discharged material at the container side walls.

16. The stack forming machine defined in claim 15 in which said support means further includes a supporting leg and a mounting apparatus carried by said wall structure, said control member comprising a rigid control arm in laterally spaced generally parallel relation to said leg, said leg and control arm having inner and outer ends adjacent said mounting apparatus and delivery section respectively, characterized by means pivotally connecting said inner ends to the mounting apparatus on laterally spaced axes parallel to the planes of said side walls, and means pivotally connecting said outer ends to said delivery section on spaced axes parallel to the axes at said inner ends.

17. The stack forming machine defined in claim 16 in which said means pivotally mounting said inner ends comprises a bracket having a plurality of laterally spaced apertures, and a pivot member engaging the inner ends of said control arm and receivable in a selected one of said apertures.

18. A stack forming machine comprising:
   a. mobile wall structure forming a container including top and bottom walls, generally vertical side walls disposed in spaced apart generally parallel relationship longitudinally of the direction of travel of the machine, and front and rear walls;
   b. said wall structure defining an opening through said front wall adjacent the top wall;
   c. means for loading the container with crop material and including an impeller mechanism and conduit means extending from the impeller mechanism to said opening;
   d. said conduit means including a movable delivery section disposed to direct material through said opening to the interior of said container, said delivery section including a tubular portion directed toward the rear end of said container;
   e. support means mounting said delivery section for movements generally transversely of the container and including a rigid leg having an upper end pivotally connected to said tubular portion on an axis extending longitudinally of the container and parallel to said container side walls, said leg having a lower end pivotally supported from said front wall on an axis parallel to the axis of pivotal connection of its upper end to the tubular portion;
   f. said delivery section including a deflector portion mounted for rotation on the axis of said rearwardly directed tubular portion and for pivotal movements on an axis normal to the axis of said rearwardly directed portion;
   g. means for imparting said pivotal movements to said deflector portion; and
   h. a control arm having opposite ends operatively pivotally connected to said deflector portion and said front wall portion on axes parallel to the pivot axes of said leg for imparting said rotary movement to said deflector portion relative to said rearwardly directed tubular portion responsive to said movement of the delivery section generally transversely of the container.

* * * * *